United States Patent [19]

Keller

[11] Patent Number: 4,933,093

[45] Date of Patent: Jun. 12, 1990

[54] FUEL FILTER

[76] Inventor: Russell D. Keller, P.O. Box 382, Clackamas, OR 97015

[21] Appl. No.: 341,024

[22] Filed: Apr. 20, 1989

[51] Int. Cl.$^5$ ............................................. B01D 35/18
[52] U.S. Cl. ................................. 210/774; 210/799; 210/805; 210/180; 210/184; 210/238; 210/416.4; 210/436; 210/444; 210/450; 210/452; 210/503; 210/DIG. 5; 123/512; 123/557; 123/DIG. 2
[58] Field of Search ......... 123/510, 514, 557, DIG. 2; 210/774, 799, 805, 180, 184, 185, 238, 251, 416.4, 436, 443, 444, 450–452, 500.1.DIG. 5, 503

[56] References Cited

U.S. PATENT DOCUMENTS

| | | | |
|---|---|---|---|
| 2,428,939 | 10/1947 | Morris | 210/185 |
| 3,049,796 | 8/1962 | Pall | 210/510.1 X |
| 4,003,356 | 1/1977 | Naylor | 123/557 |
| 4,057,493 | 11/1977 | Davies et al. | 210/DIG. 5 |
| 4,058,459 | 11/1977 | Griffin | 210/503 X |
| 4,091,265 | 5/1978 | Richards et al. | 210/440 X |
| 4,157,082 | 6/1979 | Day | 123/DIG. 2 |
| 4,320,734 | 3/1982 | Balachandran | 123/557 X |
| 4,368,716 | 1/1983 | Davis | 210/184 X |
| 4,372,260 | 2/1983 | Baker | 210/184 X |
| 4,442,819 | 4/1984 | Veach | 210/184 X |
| 4,452,213 | 6/1984 | Duprez | 123/557 X |
| 4,454,848 | 6/1984 | Duprez | 123/557 X |
| 4,454,851 | 6/1984 | Bourbonnaud et al. | 123/557 |
| 4,498,446 | 2/1985 | Judson | 210/184 X |
| 4,499,886 | 2/1985 | Hinds | 123/557 |
| 4,512,882 | 4/1985 | Fischer et al. | 210/DIG. 5 |
| 4,522,712 | 6/1985 | Fischer et al. | 210/DIG. 5 |
| 4,588,500 | 5/1986 | Sprenger et al. | 210/DIG. 5 |
| 4,624,779 | 11/1986 | Hurner | 210/185 X |
| 4,676,895 | 6/1987 | Davis | 210/184 |
| 4,770,446 | 9/1988 | Keller | 285/158 |

Primary Examiner—Robert Spitzer
Attorney, Agent, or Firm—Klarquist, Sparkman, Campbell, Leigh & Whinston

[57] ABSTRACT

A heated fuel filter and water separator is disclosed. The assembly has a filter element mounted inside a fuel container. The fuel container has an upper chamber containing a filter element and a drainable lower chamber for collecting water and sediment. A heat exchanger circulates preheated fuel from a manifold return line to heat the filtered fuel in the container. The filter element utilizes helically wound aluminum strips as the filter media.

18 Claims, 3 Drawing Sheets

FUEL FILTER

TECHNICAL FIELD

This invention relates to filters for fuel for vehicle engines. Specifically the invention relates to a heated fuel filter and water separator for fuel for use with internal combustion engines including diesel engines which utilize fuel injection as the fuel delivery system.

BACKGROUND ART

Fuel used as the power source for vehicle engines is susceptible to being contaminated by sand, dirt and other particulate materials. Fuel also is susceptible of being contaminated by water. Because of these problems, most vehicles use a fuel filter prior to delivering the fuel to the fuel distribution device, whether it be a carburetor or a fuel injection means. Fuel which has been contaminated by water will not function properly in a vehicle engine. This is particularly true of diesel fuel. Diesel engines use fuel injection as the primary means of delivering the fuel to the engine. Fuel injection systems use injectors which have extremely small bores and are susceptible to plugging by particulate material. Diesel fuel becomes more viscous as the temperature is lowered. It is therefore not uncommon to heat a fuel filter used with a diesel engine.

One method of heating a fuel filter is by circulating water from the engine block either through or around the fuel filter. This method of heating a filter causes two problems. External water lines must be used which can increase the potential of leaks in the engine cooling system and freezing of the external lines. The second problem is that a leak of the water line could introduce water into the fuel contaminating the fuel.

The present invention overcomes these problems by using excess fuel from the fuel injection system which is normally routed back to the fuel tank. This excess return fuel has been warmed by the engine manifold. The preheated return fuel is circulated through heat exchanger inside the fuel filter to heat the filtered fuel before the excess fuel returns to the fuel tank.

In addition to eliminating the problems described above, it has been found that vehicles equipped with this heated fuel filter have improved fuel mileage of ¾ miles per gallon. Particulate emissions, or smoke, is also reduced by preheating the fuel. Excessive heating of the fuel in the fuel tank is also reduced.

SUMMARY OF THE INVENTION

It is an object of the invention to provide a fuel filter and water separator assembly which is heated by preheated fuel from the manifold return lines.

It is a further object of the invention to provide a fuel filter and water separator assembly whose filter element uses metal filter media to effectuate the filtering action.

Another object of the invention is to provide a fuel filter and water separator assembly which can be drained without removing the filter element from the filter assembly.

It is also an object of the invention to provide a heated fuel filter and water separator assembly which can be easily disassembled and reassembled in the field.

A heated fuel filter and water separator assembly has a fuel container for receiving fuel from a fuel tank. The fuel container is functionally separated into an upper chamber and a lower chamber. A filter element resides in the upper chamber of the fuel container. The filter element has an inlet at its upper end and an outlet at its lower end. The filter element contains a filter media for entrapping particulate material. The filter media also assists in separating water from the fuel. The fuel which enters the filter element is discharged at its lower end into the lower chamber of the fuel container. The lower chamber of the fuel container allows sediment and water to be collected in the bottom portion of the fuel container in a bowl. A drain is provided in the bowl for periodically draining the sediment and water from the filter assembly. A fuel outlet allows filtered fuel to be passed to a fuel pump from the upper chamber of the fuel container. A heat exchanger is located in the fuel container and has an inlet connected to the manifold return of the engine. Heated excess fuel returned from the manifold drain of a fuel injection system is routed through the heat exchanger from its outlet and back to the fuel tank. The return fuel which has been heated by the manifold of the engine flows through the heat exchanger to transfer the heat to the fuel in the filter assembly.

Other objects and advantages of the present invention will be apparent from the following description of various embodiments and methods of operation thereof and from the attached drawings.

DESCRIPTION OF PREFERRED EMBODIMENTS OF THE INVENTION

Figure 1:
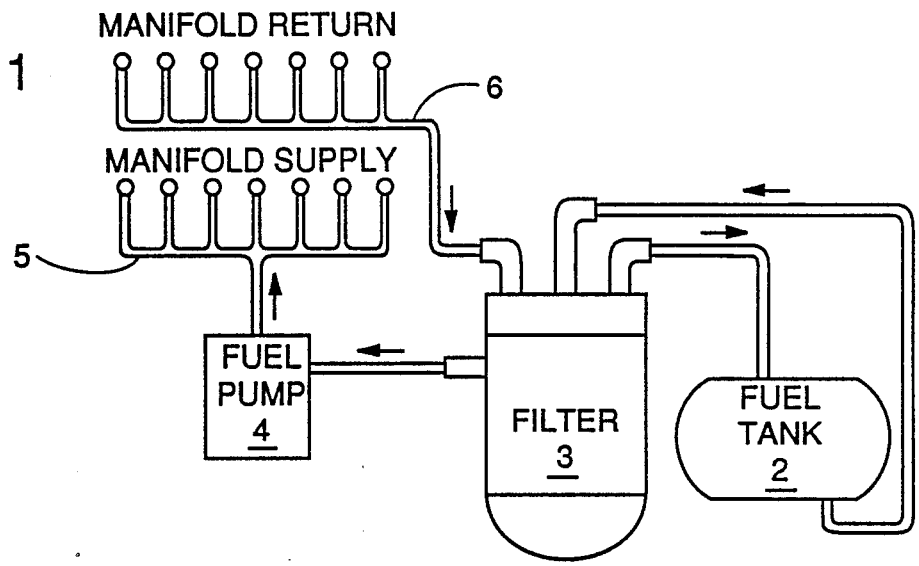
FIG. 1 is a block diagram of a fuel delivery system for an internal combustion engine which utilizes the fuel filter and water separator of the present invention.

FIG. 1 shows a typical fuel delivery system for a diesel engine which utilizes the present invention. Diesel fuel is stored in fuel tank 2. The diesel fuel is drawn from fuel tank 2 through filter assembly 3 by a fuel pump 4. The fuel is transported by fuel pump 4, under high pressure, to a manifold supply 5 connected to the fuel injectors of the diesel engine. Specific injectors and injector control systems are not shown in FIG. 1 as they are well known in the art. Unused fuel which has been heated by the engine manifold, flows to a manifold return 6 and then back to filter 3. The preheated return fuel is returned to fuel tank 2 after it passes through a heat exchanger within filter 3, as will be explained below. It should be noted that other prior art fuel injection systems return unused fuel directly from the fuel pump 4 to the tank 2, rather than using a manifold return 6. This fuel, of course, may be directed back through filter 3 to preheat the fuel in filter 3.

Figure 2:
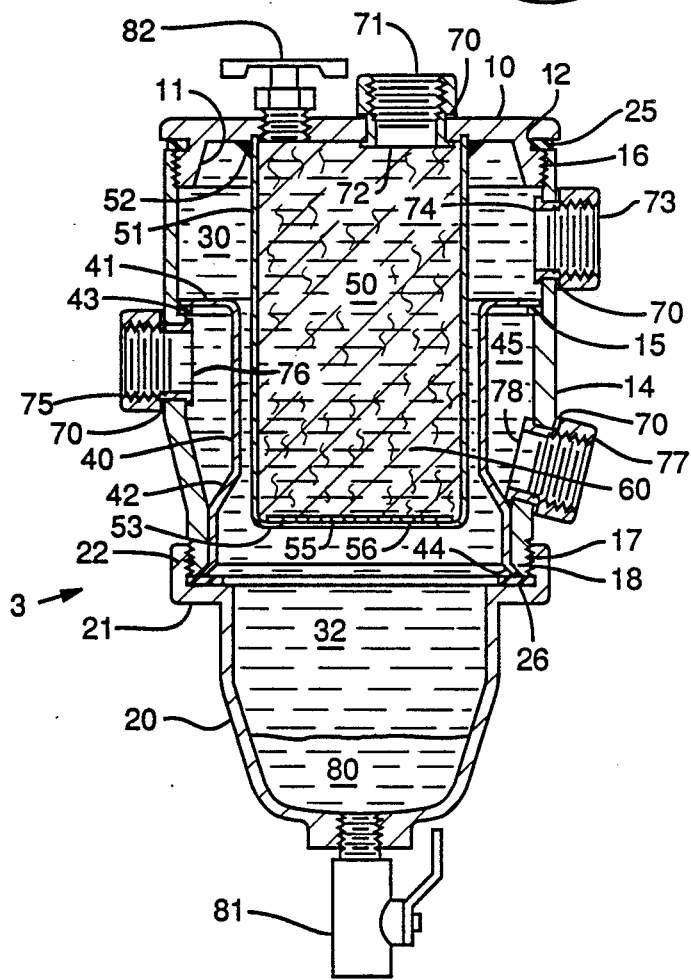
FIG. 2 is a cross-section of one embodiment of the fuel filter and water separator.

Referring now to FIG. 2, a representative example of one embodiment of the filter assembly 3 is shown. The filter assembly 3 has a top or cap 10 which can be formed of cast or machined metal or plastic. In the preferred embodiment, cap 10 is cast aluminum. Cap 10 has a downstanding flange 11 about the lower circumference of the cap. Flange 11 has external threads machined on the outside surface. Cap 10 also has a groove 12 machined about its periphery above the threads which are machined on flange 11.

A sidewall 14 is formed of thick wall aluminum tubing. The upper inside portion of sidewall 14 is machined to produce a step 15. The purpose of step 15 will be explained below. Sidewall 14 also has threads 16 machined on the inside of the upper portion of sidewall 14 and external threads 17 machined on the outside of the lower portion of sidewall 14.

A bottom cap or bowl 20 is manufactured of transparent plastic material. In the preferred embodiment, bowl 20 is cast of clear polycarbonate material. Bowl 20 has a lip 21 with an upstanding flange 22. Flange 22 has threads molded on the inside portion thereof.

Cap 10, sidewall 14, and bowl 20 fit together to form a fuel container. An elastomeric seal 25 fits into groove 12 of cap 10. Sidewall 14 is threaded onto flange 11 of cap 10 by threads 16. Seal 25 forms a fluid-tight seal between cap 10 and sidewall 14. Another elastomeric seal 26 is placed on lip 21. Bowl 20 is screwed onto sidewall 14 by means of threads 17. Seal 26 causes a fluid-tight seal between sidewall 14 and bowl 20. The fluid container is generally divided into an upper chamber 30 and a lower chamber 32.

A heat exchanger wall 40 is formed of thin aluminum sheeting to form a jacket. The heat exchanger has a top flange 41 which projects outwardly at generally a 90° angle from the heat exchanger wall 40. The lower portion 42 of the heat exchanger wall 40 is expanded outwardly to be coincidental with sidewall 14. An elastomeric seal 43 is placed on step 15 of sidewall 14. A force is applied to flange 41 to partially compress seal 43. A lip 44 is spun out from the lower portion 42 of the heat exchanger wall to lock the heat exchanger to the sidewall 14 by having lip 44 be coincidental to bevel 18. Seal 26 forms a fluid-tight seal between lip 44 and lip 21. This arrangement provides a heat exchanger passage 45 formed on the outside of heat exchanger wall 40 and on the inside of sidewall 14.

A filter element 50 is located in the upper chamber 30 of the fluid container. The filter element has a sidewall 51 which is welded to cap 10 by weld bead 52. The filter element sidewall 51 has a bottom lip 53 which retains a fluid outlet plate 55. Fluid outlet plate 55 has several holes 56 drilled through the plate to allow fuel which is passed through filter element 50 to flow into lower chamber 32. The holes 56 are approximately 3/16" in diameter. The filter element 50 is packed full of filter media 60. The filter media 60 will be explained below.

Filter assembly 3 has a fuel inlet 71 and a fuel outlet 73. A return fuel inlet 77 communicates with the heat exchanger passage 45, and a return fuel outlet 75 allows the returned fuel to flow back to fuel tank 2. Specifically designed internally threaded connectors 72, 74, 76 and 78 are used for these fittings. These connectors are similar to those described in U.S. Pat. No. 4,770,446. These connectors are designed with a tubular body beneath the head portion. An elastomeric "O" ring type seal 70 fits beneath the head. The tubular body is spun over on the inside of the container, compressing the "O" ring, providing a fluid-tight seal between the connector and the container.

Fuel from fuel tank 2 is drawn through fuel inlet 71 into the filter element 50. The fuel passes through filter element 50, where it is filtered by filter media 60. Filter media 60, due to its unique construction as will be explained below, also assists in separating water from the fuel. The filtered fuel passes through the openings 56 in the filter element plate 55, into the lower chamber 32 of the fuel container. Water 80, sediment and algae collects on the bottom of bowl 20. The filtered fuel, being lighter than the water 80, fills the fluid container into upper chamber 30. The fuel is withdrawn from fuel outlet 73 by fuel pump 4.

The water 80 collected in bowl 20 is periodically drained through drain valve 81. A pressure relief valve 82 is located in cap 10 to facilitate draining the water 80 by allowing air to enter the fluid container, breaking the fluid lock.

Excess fuel which has been heated by the engine manifold is collected by manifold return 6. The returned fuel is routed through return fuel inlet 75, where it fills heat exchanger passage 45. The heat from the returned fuel is conducted through top 41, sidewall 40 and bottom 42 of the heat exchanger to preheat the filtered fuel in upper chamber 30. It has been found that the filtered fuel will be heated to and maintain a temperature of at least approximately 70° F. This heated filtered fuel is removed from fuel outlet 73 and fed by fuel pump 4 to manifold supply 5. It has been found that fuel economy is increased by $\frac{3}{4}$ miles per gallon, and smoke or hydrocarbon emissions have been greatly reduced.

The filter assembly 3 is mounted on the engine, rather than the frame of the vehicle. This mounting reduces the number and length of flexible fuel lines required to bring fuel to and from the filter assembly, thus reducing the complexity and cost of installation.

Figure 3:
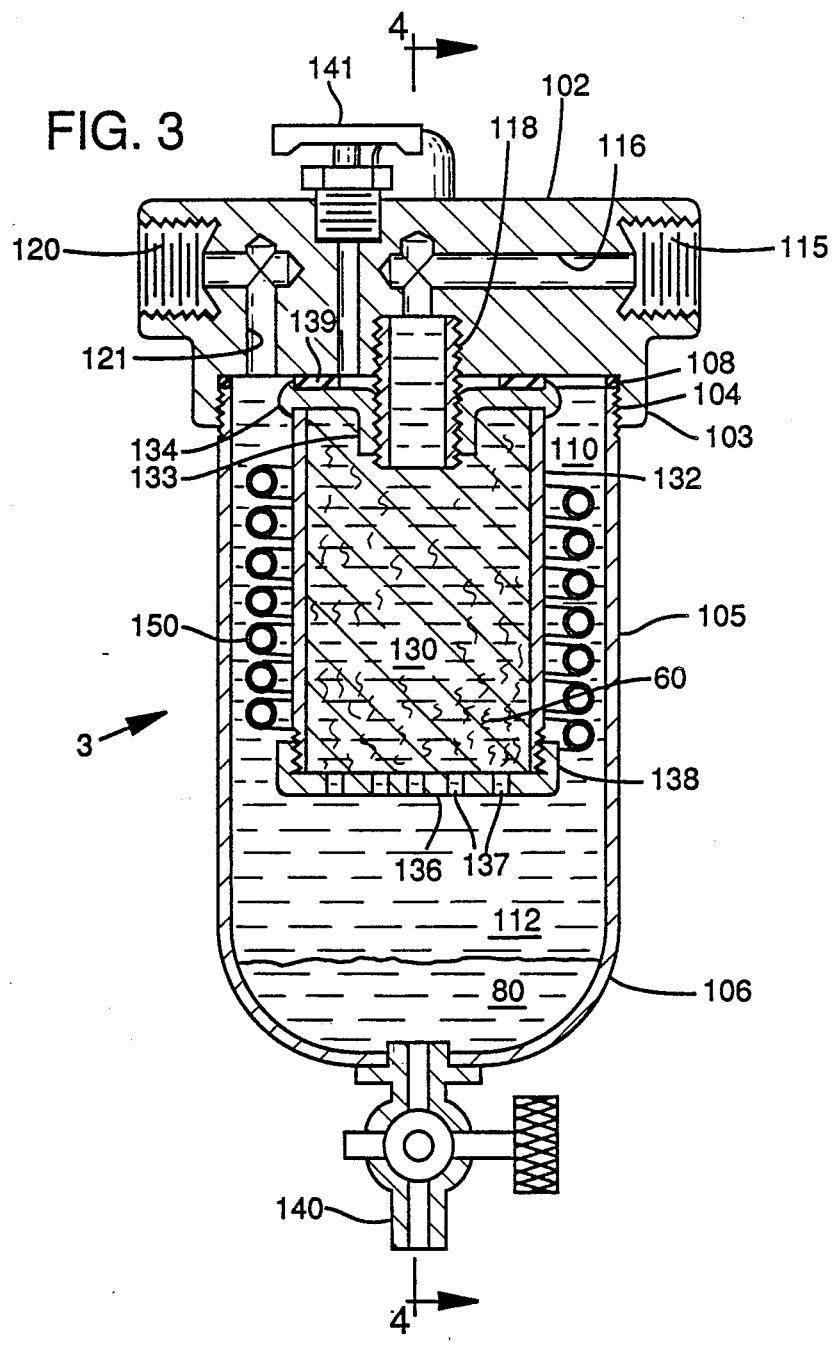
FIG. 3 is a cross-section of an alternate embodiment of the fuel filter and water separator of the present invention.

An alternate embodiment of filter assembly 3 is shown in FIG. 3. A cap 102 is cast of metal or plastic. Preferably an aluminum alloy is used for the cap 102. The cap 102 has a downstanding flange or lip 103. Internal threads 104 are cast or machined on the inside of lip 103. A deep drawn shell 105 of steel or aluminum is provided for attachment to cap 102. The bowl 20 of FIG. 2 is integral with the shell in this embodiment, as shown by bowl 106. External threads are provided on the upper outside surface of shell 105 which match and mate to threads 104 on the lip 103 of cap 102. An elastomeric seal 108 provides a fluid-tight seal when shell 105 is mated to cap 102. The fluid-tight container is a combination of cap 102 and shell 105. The fluid container is again functionally divided into an upper chamber 10 and a lower chamber 112. Rather than separate fittings, as shown in the embodiment of FIG. 2, the die cast cap 102 can have a fuel inlet 115 internally cast integral with cap 102. Drilled passage 116 provides a fuel path to the central portion of cap 102. A steel nipple 118 can be cast integral with cap 102. In an alternate attachment method, threads may be machined into cap 102 to accept nipple 118. A fuel outlet 120 may be cast integral with cap 102. A drilled passage 121 allows fuel to be removed from the fuel container.

A removable, replaceable fuel filter element 130 is located centrally within the upper chamber 110 of the fuel container. The fuel filter element 130 has a sidewall 132 made of aluminum tubing. A top 133 of the fuel filter element 130 has a threaded flange for accepting nipple 118. Top 133 is welded to sidewall 132 by weld bead 134. A bottom cap 136 is attached to the bottom of sidewall 132. Bottom cap 136 may be welded to sidewall 132 if the filler element is to be disposable. In the embodiment shown in FIG. 3, bottom cap 136 has a threaded upstanding flange 138, which is screwed onto the sidewall 132 by threads machined on the outside of sidewall 132. This allows disassembly of the fuel filter after it has been removed from filter assembly 3. A fuel outlet from the filter element 130 is provided by holes 137 drilled in bottom cap 136. Holes 137 are typically 3/16" in diameter. Filter element 130 is filled with a filter media 60, as in the embodiment shown in FIG. 2. Details of the filter media 60 will be given below. Filter element 130 is screwed onto nipple 118 for assembly. An elastomeric seal 139 fits between cap 102 and the top 133 of filter element 130 to form a fluid-tight seal. Weld bead 134 assists in locating seal 139 between cap 102 and filter element top 133.

Fuel from fuel tank 2 is drawn into fuel inlet 115. The fuel passes through passage 116, through nipple 118, into filter element 130. Water is separated by filter media 60, which also entraps particulate material. The filtered fuel passes through fuel filter outlet holes 137 into lower chamber 112 of the fuel container. Water 80 settles in the bowl 106 in the bottom of the lower chamber 112. The filtered fuel, being lighter than the water, fills upper chamber 110. The fuel is removed from upper chamber 110 through passage 121 and fuel outlet 120 by fuel pump 4. Periodically, the water 80, sediment and algae is removed from bowl 106 through drain valve 140. A pressure relief valve 141 is located in cap 102 to relieve any fluid lock in the fuel container to allow the water 80 to drain. A heat exchanger 150 is located in upper chamber 110 to heat the filtered fuel.

Figure 4:
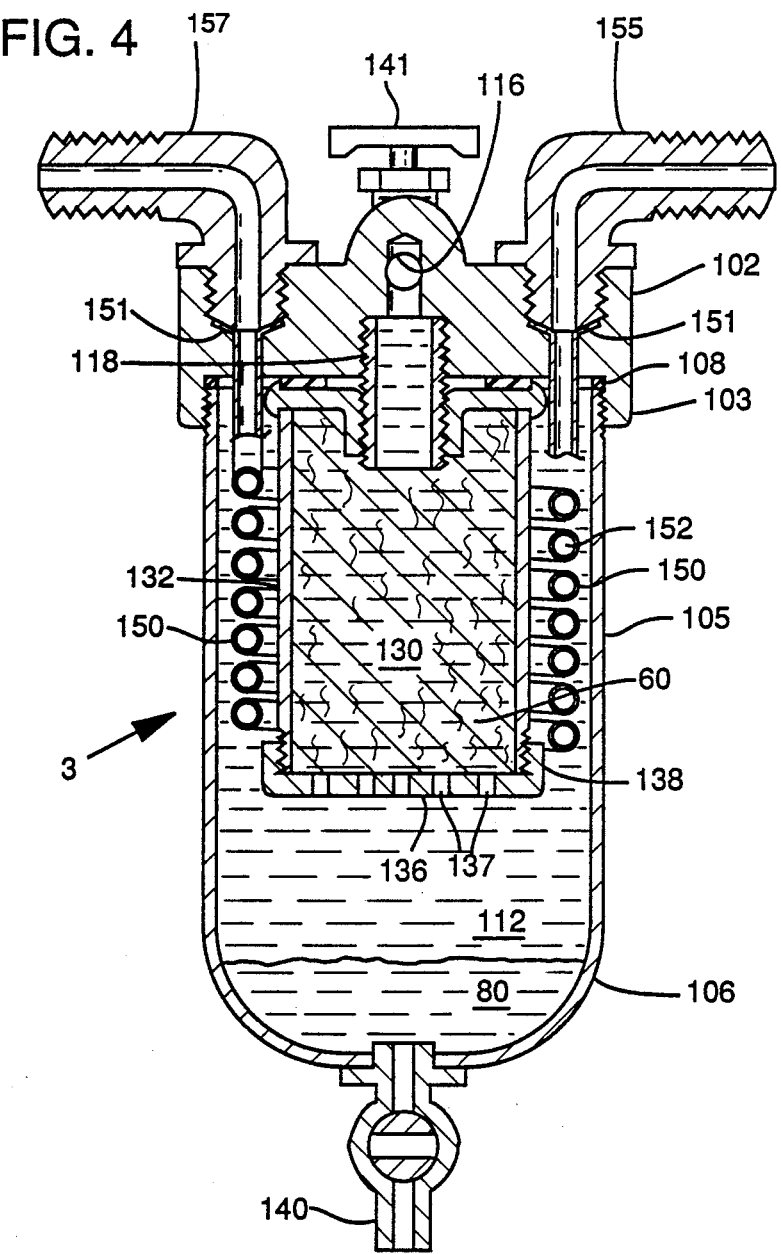
FIG. 4 is a cross-section of the alternate embodiment of the fuel filter and water separator of FIG. 3 along section lines 4—4.

In referring to FIG. 4, a better illustration of the heat exchanger 150 can be seen. Heat exchanger 150 is composed of coils of copper or aluminum tubing. The tubing inlet and outlet are routed through machined passages in cap 102. The tubing may have flares 151, where it passes into cap 102, or ferrules or other sealing means may be used to effect a fluid-tight joint. The heat exchanger passage 152 is the inside of the tubing. Cap 102 is machined to accept a brass fitting 155 for a return fuel inlet and another brass fitting 157 for return fuel outlet. The return fuel inlet 155 is connected to the bottom end of the heat exchanger coil 150, while the return fuel outlet 157 is connected to the top end of such coil. Heated return fuel from manifold return 6 flows into return fuel inlet 155, upwardly in the spiral path of passage 152 through heat exchanger 150, to return fuel outlet 157. The fuel is returned to the fuel tank 2 after passing through the heat exchanger 150.

Several advantages are found in the embodiment of the filter assembly 3 illustrated in FIGS. 3 and 4. All fuel fittings are integral with cap 102. Although bowl 106 is not transparent, it does allow a one-piece shell 105 which eliminates a seal and a joint which can leak. The shell 105 may be unscrewed from the cap in one piece. Filter element 130 may be removed by unscrewing from nipple 118. The filter element 130 may be disassembled by unscrewing lower cap 136. Filter media 60 may be removed and replaced with new filter media.

Figure 5:
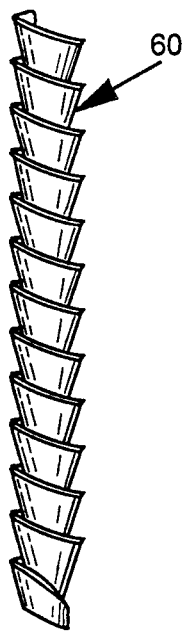
FIG. 5 is a plan view of the filter media of the present invention.

The filter media 60 is specifically manufactured out of thin aluminum strips. In one embodiment, strip aluminum material 0.20" thick, and 0.325" wide is tightly wound into a helix, as shown in FIG. 5. The helix formed approximately 6 coils per inch, with the coils having an outside diameter of 0.290". The helix is wound tight enough so that no central hole exists. The filter media 60 is loaded into the filter element with the open end up, as shown in FIG. 5. The fuel must circulate down the helix in a downwardly circular path. This helps to coalesce the water particles into droplets and entrap particulate material upon the filter media.

In another embodiment, strips 0.250" wide and 0.020" thick are wound into a helix having 8 coils per inch with an outside diameter of 0.250". The range of various dimensions are almost limitless, but strips 0.125" wide to 0.375" wide and 0.005" thick to 0.025" thick wound into helixes having between 5-10 coils per inch and an outside diameter of 0.10" to 0.35" are possible with the present manufacturing facilities. The helixes are cut to a proper length to fit within the filter element housings. This length may be between 2 inches and 6 inches.

Obviously, many modifications and variations of the present invention are possible in light of the above teachings. It is, therefore, to be understood that within the scope of the appended claims the invention may be practiced otherwise than as specifically described.

I claim:

1. A method of filtering and heating fuel comprising the steps of:
   pumping fuel from a fuel tank to a fuel container;
   passing the fuel through a filter element located inside said fuel container;
   collecting the filtered fuel in said fuel container, said fuel container having an upper chamber and a lower chamber;
   collecting water and sediment in the lower chamber of the fuel container;
   removing filtered fuel from the upper chamber of the fuel container;
   pumping filtered fuel to a fuel injection system;
   heating the fuel with heat from an engine;
   collecting heated excess fuel as heated return fuel;
   passing the heated return fuel through a heat exchanger in the fuel container said heat exchanger located about the filter element;
   routing the return fuel from the heat exchanger to the fuel tank; and
   periodically draining the lower chamber of the fuel container of water and sediment.

2. A method of filtering and heating fuel comprising the steps of:
   placing filter media comprised of helically wound aluminum strips into a filter element;
   attaching the filter element to a cap of fuel filter assembly;
   attaching a closed container to the cap of the fuel filter assembly about the filter element to form a fuel container;
   enclosing a heat exchanger within the fuel container about said filter element;
   flowing fuel from a fuel tank through the filter element into the fuel container;
   pumping fuel from the fuel container to a manifold supply;
   heating the fuel with heat from an engine manifold;
   collecting unused fuel with a manifold return;
   circulating the heated unused fuel through the heat exchanger;
   preheating the filtered fuel with heat from the heated unused fuel; and
   returning the unused fuel to the fuel tank.

3. A heated fuel filter and water separator assembly for a vehicle comprising:
   a fuel container having a fuel inlet and a fuel outlet;
   filter means located inside said fuel container to filter fuel and separate water;
   collector means located beneath said filter means inside said fuel container to collect the water; and heat exchanger means located inside said fuel container and outside said filter means to heat the fuel with preheated return fuel.

4. A fuel filter assembly as recited in claim 3, wherein the filter means is comprised of a filter element containing a filter media.

5. A fuel filter assembly as recited in claim 4 wherein the filter media is comprised of helically wound aluminum strips housed within a filter element, said filter element having an inlet at its upper end for receiving fuel and a plurality of outlets at its lower end for dispensing fuel.

6. A fuel filter assembly as recited in claim 5 wherein the helically wound aluminum strips are comprised of aluminum strips 0.125 inches to 0.375 inches wide, 0.005 to 0.025 inches thick, wound into a helix having 5–10 coils per inch with the coils having an outside diameter of 0.010 to 0.35 inches in diameter and the elements having an overall length of 2 inches to 6 inches.

7. A fuel filter assembly as recited in claim 4 wherein the collector means is comprised of a chamber beneath said filter element.

8. A fuel filter assembly as recited in claim 3 wherein the heat exchanger means is comprised of a heat exchanger passage for the circulation of preheated fuel returning from an engine manifold.

9. A fuel filter assembly as recited in claim 8 wherein the heat exchanger passage is comprised of coils of metal tubing within the fuel container.

10. A fuel filter assembly as recited in claim 8 wherein the heat exchanger passage is comprised of metal jacket within the fuel container.

11. A fuel filter assembly comprising:
a fluid tight fuel container;
said fuel container having an upper chamber and a lower chamber;
said fuel container having a fuel inlet and a fuel outlet;
a filter element located in the upper chamber of the fuel container;
said filter element having an inlet and an outlet;
the inlet of the filter element connected to the fuel inlet of the fuel container;
the filter element outlet communicating with the lower chamber of the fuel container;
the fuel outlet of the fuel container connected to the upper chamber of the fuel container; and
a fluid tight heat exchanger inside the fuel container about the outside of said filter element to heat the fuel with preheated return fuel.

12. A fuel filter assembly, as recited in claim 11, wherein the filter element includes a filter media comprised of helically wound aluminum strips.

13. A fuel filter assembly as recited in claim 12 wherein the helically wound aluminum strips are comprised of aluminum strips 0.125 inches to 0.375 inches wide, 0.005 inches to 0.025 inches thick, wound into a helix having 5–10 coils per inch with the coils having an outside diameter of 0.10 to 0.35 inches and the elements having an overall length of 2 inches to 6 inches.

14. A fuel filter assembly as recited in claim 11 wherein a drain valve is attached to the lower chamber of the fuel container.

15. A fuel filter assembly as recited in claim 11 wherein the heat exchanger is hollow tubular coils within said fuel container.

16. A fuel filter assembly as recited in claim 11 wherein the heat exchanger is a metal jacket in the fuel container.

17. A heated fuel filter and water separator assembly for a vehicle comprising:
a fuel container for receiving fuel from a fuel tank;
the fuel container having an upper chamber and a lower chamber;
a filter element having an inlet and an outlet, said filter element located inside the upper chamber of the fuel container;
a fuel inlet for receiving fuel from the fuel tank;
the fuel inlet communicating with the inlet of the filter element;
fuel filter media located within the filter element;
the outlet of the filter element lying beneath the fuel filter media and passing filtered fuel to the lower chamber of the fuel container;
a means to drain the lower chamber of the fuel container;
a fuel outlet attached to the upper chamber of the fuel container for removing fuel from the fuel container and supplying the fuel to a fuel pump;
a heat exchanger located inside the fuel container outside the filter element;
the heat exchanger having a return fuel inlet and a return fuel outlet;
the return fuel inlet receiving preheated fuel from a return fuel manifold; and
the return fuel outlet delivering fuel from the heat exchanger to the fuel tank.

18. A heated fuel filter and water separator assembly for a vehicle comprising:
a fluid-tight fuel container, said fuel container having a cap, an upper chamber, and a lower chamber;
a filter element having a fuel inlet and a fuel outlet, said filter element located inside the upper chamber of said fuel container, said filter element attached to said cap;
a filter media located inside said filter element, said filter media comprised of a plurality of helically wound aluminum strips, said aluminum strips being 0.125 inches to 0.375 inches wide, and 0.005 inches to 0.025 inches thick, each of said aluminum strips wound in a helix, each of said helixes having 5–10 coils per inch with an outside diameter of between 0.010 inches and 0.35 inches and a length of between 2 inches and 6 inches;
a fuel inlet through said cap communicating with said fuel inlet of said filter element for receiving fuel from a fuel tank;
said filter media removing particulate contamination from the fuel and coalescing water in the fuel;
the fuel outlet of said filter element passing fuel and coalesced water to said lower chamber wherein the water remains in the lower chamber while the filtered fuel fill the upper chamber;
a fuel outlet communicating with said upper chamber to pass filtered fuel to a fuel pump;
a fluid-tight heat exchanger having a fuel inlet and a fuel outlet, said heat exchanger located in said upper chamber about the filter element;
said fuel inlet of said heat exchanger receiving preheated excess return fuel;
said fuel outlet of said heat exchanger passing excess return fuel to said fuel tank;
said heat exchanger transferring heat from the preheated excess return fuel to the filtered fuel in said upper chamber; and
a drain valve in said lower chamber to remove water from said lower chamber.

* * * * *